(12) United States Patent  (10) Patent No.: US 7,835,392 B2
Wang  (45) Date of Patent: Nov. 16, 2010

(54) SYSTEM AND METHOD FOR MESSAGE CONVERTING

(75) Inventor: Rui Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 463 days.

(21) Appl. No.: 11/889,293

(22) Filed: Aug. 10, 2007

(65) Prior Publication Data

US 2008/0037582 A1  Feb. 14, 2008

(30) Foreign Application Priority Data

Aug. 11, 2006  (CN) .................. 2006 1 0104385

(51) Int. Cl.
*H04J 3/22*  (2006.01)
(52) U.S. Cl. .................. 370/466; 370/401; 370/467
(58) Field of Classification Search ............... 370/401, 370/466, 467
See application file for complete search history.

(56) References Cited

U.S. PATENT DOCUMENTS

| | | | |
|---|---|---|---|
| 6,445,919 B1 | 9/2002 | Suonvieri | |
| 7,024,209 B1 * | 4/2006 | Gress et al. | 455/466 |
| 2002/0082030 A1 * | 6/2002 | Berndt et al. | 455/466 |
| 2003/0016639 A1 | 1/2003 | Kransmo et al. | |
| 2004/0057403 A1 * | 3/2004 | Jerbi et al. | 370/329 |
| 2005/0010573 A1 * | 1/2005 | Garg | 707/10 |
| 2006/0014530 A1 * | 1/2006 | Denenberg et al. | 455/414.1 |
| 2007/0191035 A1 * | 8/2007 | Huggett | 455/466 |

FOREIGN PATENT DOCUMENTS

| | | |
|---|---|---|
| CN | 1267415 A | 9/2000 |
| CN | 1555659 A | 12/2004 |
| WO | WO 02/091200 A1 | 11/2002 |

* cited by examiner

*Primary Examiner*—Jason E Mattis
(74) *Attorney, Agent, or Firm*—Finnegan, Henderson, Farabow, Garrett & Dunner LLP

(57) ABSTRACT

A message converting method is disclosed, including: recognizing a type of a received message, sending the message to a message parsing module matching the type of the message; acquiring recipient information and the content of the message carried in the message; selecting an destination communication manner supporting the content of the message, and acquiring new recipient information corresponding to the recipient information and the destination communication manner; encapsulating the sender information, the new recipient information and corresponding content of the message supported by the destination communication manner, and sending a new message generated through the encapsulation to an address designated by the new recipient information. A message converting device is also disclosed. A communication manner suitable for content of message may be selected for sending the message, thus bringing convenience to users, and lowering requirements on terminals.

23 Claims, 6 Drawing Sheets

SYSTEM AND METHOD FOR MESSAGE CONVERTING

This application claims the priority of the Chinese patent application No. 200610104385.1 submitted to the Chinese Patent Office on Aug. 11, 2006, titled "Device and Method for Message Converting", the entire content of which is incorporated herein by reference.

FIELD OF THE INVENTION

The present invention relates to the field of communications, and in particular to a system and method for message converting.

BACKGROUND OF THE INVENTION

Message communications, with such features as being express, convenient, economical, and rich in content and form, have become a communication manner which is widely used by network users and which includes such examples as: text message, multimedia message, Email and Instant Message (IM). Because each model has a different capability, various types of existing terminals support many communication manners that are consequently different from one another more or less. For example, a Personal Computer (PC) does not support multimedia message and text message, a terminal with a monochromatic display does not support multimedia message, and some mobile phones do not support Email, IM, etc.

An existing message processing system is composed of a server and a client, in which the server is used for forwarding messages, implementing communications among different networks, and coping with abnormal conditions at terminals (for example, a memory in a terminal is fully occupied); and the client is used for generating and parsing messages and communicating with the server. Since neither the client nor the server has a function of converting the message format, a terminal, if not supporting a certain communication manner, can neither recognize the information expressed by the communication manner nor send or receive the information expressed by the communication manner, and thus can not communicate, by means of the information expressed by the communication manner, with a terminal supporting the communication manner.

At present, it has come true in the prior art that a text message or a multimedia message can be converted into an Email, so that when a user sends a message with a terminal supporting text message or multimedia message to a PC not supporting text message or multimedia message, he or she may enter the Email address of the recipient into the recipient address of the text message or multimedia message. When the text message or multimedia message arrives at the text message or multimedia message gateway, the gateway sends the content of the text message or multimedia message as the content of an Email to the recipient's Email address, taking the recipient's Email address as the recipient address.

Established in June 2002, the Open Mobile Alliance (OMA) includes the world's major mobile operators, devices and network providers, information technology companies, application developers and content providers. The principal pursuit of the OMA is a system-irrelevant and open standard that allows all kinds of applications and services to be interconnected and intercommunicated with one another over all kinds of terminals throughout the globe. Defined in the Instant Messaging and Presence Service (IMPS) defined by the OMA, the manner of conversion between an IM and a text message implements the message conversion between the IM and the text message. When a terminal user sends a text message to a PC not supporting text message, if he or she enters an IM user's name into the recipient address, the text message gateway sends the text message to the PC corresponding to the IM user's name. Similarly, a user should also enter the number of the recipient's terminal into the recipient address when sending an IM to the terminal by means of IM.

In the process of implementing the present invention, the inventor has noticed that in the prior art, a terminal user at the sender side should be aware beforehand of information of the model and capability of the terminal at the recipient side in order to enter appropriate information of the recipient address into the recipient address of a message, thereby achieving conversion of the message format. However, with the expansion of the social circle of terminal users due to their needs in all aspects such as business and living, it becomes increasingly cumbersome and less likely for them to bear in mind information of many models and capabilities of many terminals. Moreover, with the constant update of terminal types, there is a possibility that users may change their terminals frequently, which also frustrates terminal users with great inconvenience in keeping track of and ever updating information on the terminal model and capability of users in contact therewith. In addition, each terminal user needs to store all the contact information of terminal users in contact therewith, which occupies a relatively larger storage capacity and requires a terminal with a relatively higher storage performance.

Furthermore, an existing gateway, when forwarding a message to a recipient, simply forwards them to the recipient address pre-entered by the sender rather than selecting an appropriate communication manner in accordance with the content of the message and information of the capability of the terminal at the recipient side. Consequently, the terminal at the recipient side cannot properly recognize or display the content of the message if, in the message, there exists content of message not supported by the selected communication manner, thereby bringing terminal users great inconvenience, and even certain loss if the content of message is of considerable importance.

Therefore, a need exits for an improved system and method for message converting to overcome the problems stated above.

SUMMARY OF THE INVENTION

Embodiments of the present invention provide a system and method for message converting, thereby the communication manner for sending messages and information of the recipient can be converted in accordance with the contents of the messages.

An embodiment of the present invention provides a system for message converting including: a message recognizing module configured for recognizing a type of a message and providing the message according to the type; a message parsing module configured for parsing the message provided by the message recognizing module and acquiring sender information, recipient information and content of the message carried in the message; a message converting module configured for obtaining conversion manner information for a terminal at a recipient, determining an destination communication manner for sending the message according to the content of the message and the conversion manner information, and converting the recipient information into new recipient information corresponding to the destination communication manner; and a message encapsulating module configured for encapsulating the sender information, the new recipient information and corresponding content of the message supported by the destination communication manner to generate a new message.

Another embodiment of the present invention provides a message converting method including: receiving a message to be sent to a recipient from a sender; obtaining sender information, recipient information and content of the message from the message, and conversion manner information of a terminal at the recipient; determining an destination communication manner supporting the content of the message pursuant to the conversion manner information and the recipient information; acquiring new recipient information according to the recipient information and the destination communication manner; and encapsulating the sender information, the new recipient information and corresponding content of the message supported by the destination communication manner.

With reference to the drawings, technical solutions of the embodiments of the present invention are further described in detail below.

DETAILED DESCRIPTION OF THE EMBODIMENTS

The embodiments of the present invention provide a system and method for message converting, which converts the communication manner for sending a message as well as recipient information in accordance with the content of the message, wherein conversion manner information for each user's terminal and user information corresponding to each destination communication manner are stored beforehand in an information storing module, and a message converting module, after receiving the message, converts in accordance with the type of the message the original communication manner for sending the message into a communication manner supported by the terminal at the recipient side so as to send the message to an address designated by the new recipient information corresponding to the destination communication manner.

In the embodiments of the present invention, the sender or recipient information refers to the information for uniquely identifying a user's identity, which may be the user's identification number, the user's contact information or other information. In the following embodiments of the present invention, description is given with contact information of a sender and recipient as an example, while other information identifying a user's identity may also be easily implemented with reference to the following embodiments.

An embodiment of the present invention provides a message converting device that can be arranged between a terminal at the sender side and a terminal at the recipient side in a Point-to-Point communications system. Another embodiment of the present invention provides a message converting device that can be arranged between a terminal at the sender side and a message server in a Point-to-Multipoint communications system. In the following embodiments, description is given in regard to the Point-to-Multipoint communications system, while the Point-to-Point communications system, the mechanism of which is the same, may be easily implemented with reference to these embodiments.

Figure 1:
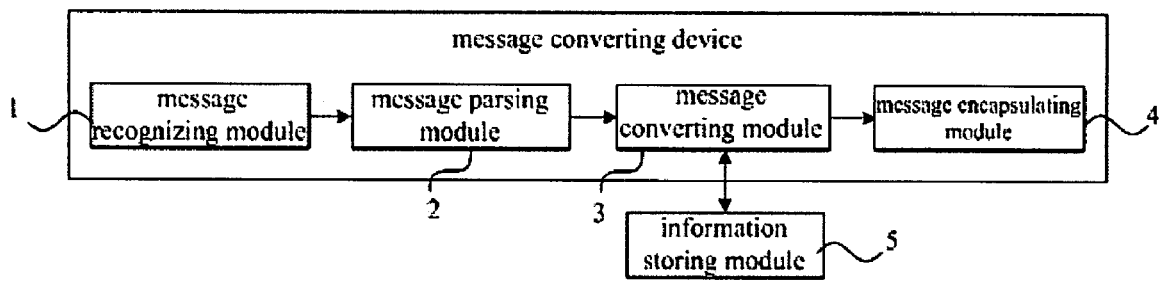
FIG. 1 is a schematic diagram showing the configuration of Embodiment 1 of the message converting device according to the present invention.

FIG. 1 is a schematic diagram of the configuration of Embodiment 1 of the message converting device according to the present invention. The message converting device includes a message recognizing module 1, a message parsing module 2, a message converting module 3 and a message encapsulating module 4 that are connected in series, wherein:

the message recognizing module 1 is used for receiving a message sent from a terminal at the sender side, recognizing the type of the message, and sending the message to the message parsing module 2 matching the type. In addition, the message recognizing module 1 may also store information on message parsing module, indicating relevant information on the message parsing module connected to the message recognizing module 1;

the message parsing module 2 is used for parsing the message and acquiring contact information of the sender sending the message, contact information of the recipient indicating the destination address of the message and content of the message carried in the message;

the message converting module 3 is used for selecting an destination communication manner supporting the content of the message in accordance with the content of the message and conversion manner information for the terminal at the recipient side, and converting the contact information of the recipient into new contact information of the recipient corresponding to the destination communication manner. In addition, the message converting module 3 may also store information on message encapsulating module, indicating relevant information on the message encapsulating module connected to the message converting module 3;

the message encapsulating module 4 is used for encapsulating the contact information of the sender, the new contact information of the recipient and the content of the message corresponding to the new contact information of the recipient, and sending the new message generated through the encapsulation to a message server corresponding to the destination communication manner.

The message converting module 3 in the message converting device may be connected with an information storing module 5 which is separated from the message converting device, thereby forming a message converting system composed of the message converting device and the information storing module. The information storing module 5 is used for storing conversion manner information for a terminal and contact information of a terminal user corresponding to all the communication manners it supports. Shown below in Table 1 are the specific contents of the information stored in the information storing module 5.

TABLE 1

| Terminal user | Conversion manner | | Contact information |
|---|---|---|---|
| | Original communication manner | Destination communication manner | |
| 130XXXXXXXX | multimedia message | text message | 130XXXXXXXX |
| | | Email | xxx@123.com |
| | | IM | 123456000 |
| 131YYYYYYYY | IM | text message | 131YYYYYYYY |
| | | multimedia message | 131YYYYYYYY |
| | Email | multimedia message | 131YYYYYYYY |

Figure 2:
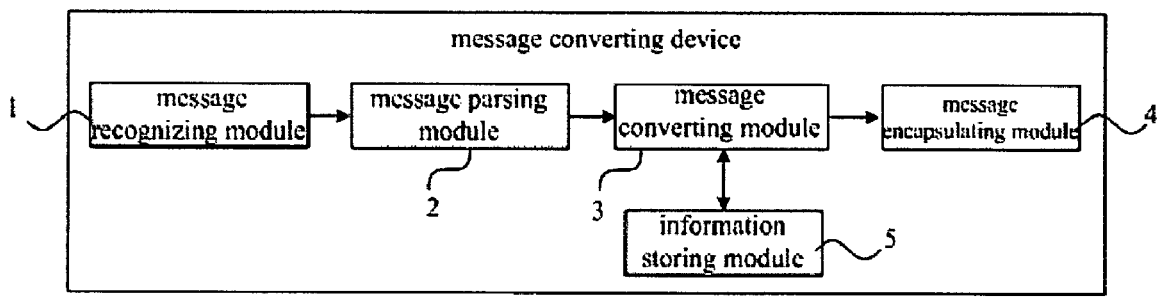
FIG. 2 is a schematic diagram showing the configuration of Embodiment 2 of the message converting device according to the present invention.

In addition, the information storing module 5 may also be disposed in the message converting device. FIG. 2 is a schematic diagram of the configuration of Embodiment 2 of the message converting device that includes the information storing module 5 according to the present invention.

In the embodiment shown in FIG. 2, the message parsing module 2 may be a text message parsing module, a multimedia message parsing module, a mail parsing module, an Instant Message parsing module and/or other parsing modules. The message encapsulating module 4 may be a text message encapsulating module, a multimedia message encapsulating module, a mail encapsulating module, an Instant Message encapsulating module and/or other encapsulating modules.

Figure 3:
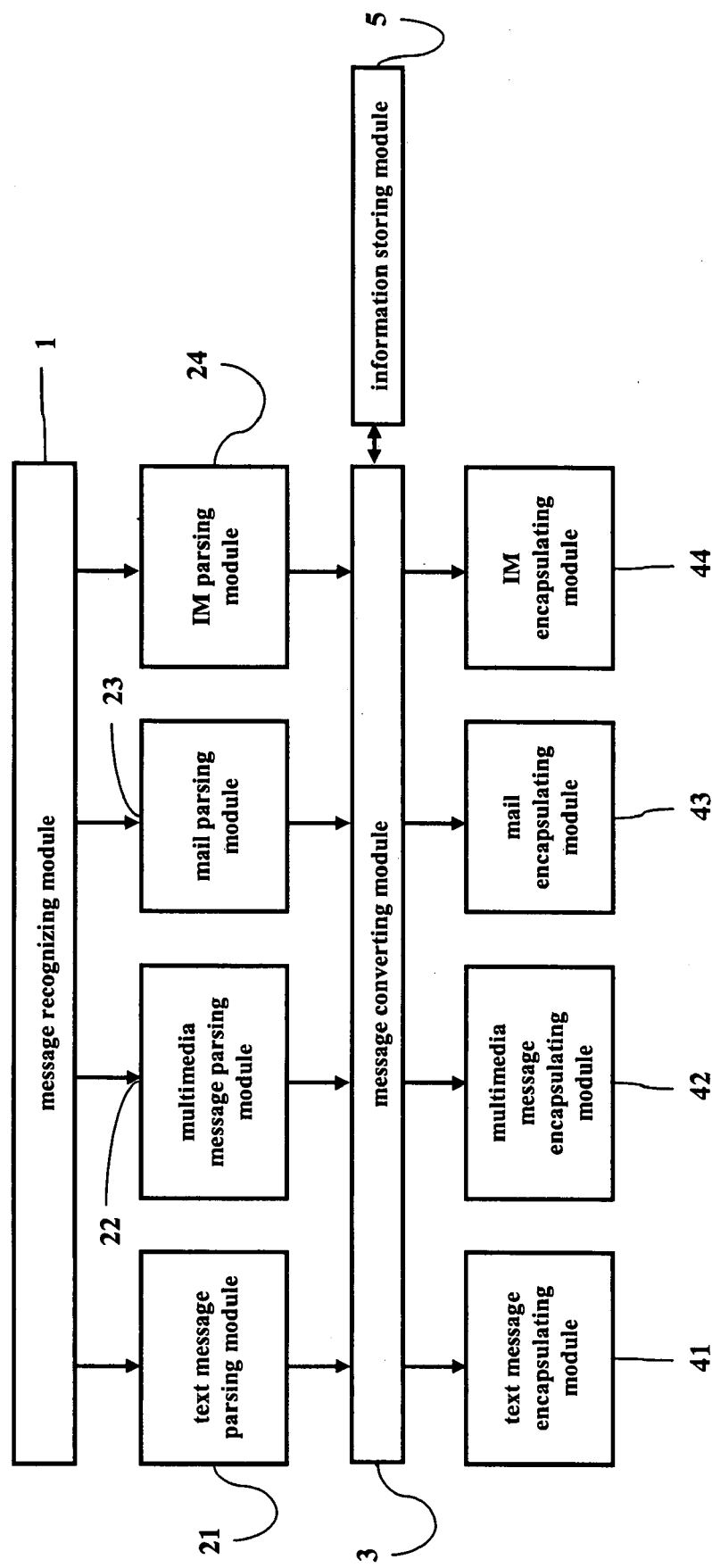
FIG. 3 is a schematic diagram showing the configuration of Embodiment 3 of the message converting device according to the present invention.

FIG. 3 is a schematic diagram of the configuration of Embodiment 3 of the message converting device according to the present invention. The message converting device includes a message recognizing module 1, a message converting module 3, an information storing module 5, a message parsing module including a text message parsing module 21, a multimedia message parsing module 22, a mail parsing module 23 and an Instant Message parsing module 24, and a message encapsulating module including a text message encapsulating module 41, a multimedia message encapsulating module 42, a mail encapsulating module 43, and an Instant Message encapsulating module 44. The message converting module 3 and the information storing module 5 may be arranged integrally or separately.

In Embodiments 1 through 3 described above, the message recognizing module recognizes the type of a message before sending it to the corresponding message parsing module to ensure a correct parsing of the content of the message. Then the message converting module selects an destination communication manner supported by the terminal at the recipient side and meanwhile supporting the content of the message in accordance with the content of the message and conversion manner information for the terminal at the recipient side, and converts the contact information of the recipient into new contact information of the recipient corresponding to the destination communication manner. After being encapsulated by the message encapsulating module corresponding to the destination communication manner, the corresponding content of the message is sent in the destination communication manner to an address designated by the new contact information of the recipient. During the above process, there is no need for the user to store and be aware of information on the model and capability of the terminal at the recipient side beforehand, thereby bringing convenience to the user, occupying a relatively smaller storage capacity of the terminal and lowering the cost of the terminal. The message converting module determines the destination communication manner that can support the corresponding content in accordance with the content of the message, thus effectively ensuring that the message can be recognized by the recipient properly and completely when the capability of the terminal at the recipient side permits, thereby avoiding the situation that a terminal at the recipient side, which does not support the communication manner pre-selected by the user at the sender side, fails to properly and completely recognize the entirety or part of the content of the message sent by the terminal at the sender side and thus frustrates the user with inconvenience and disadvantageous results.

Figure 4:
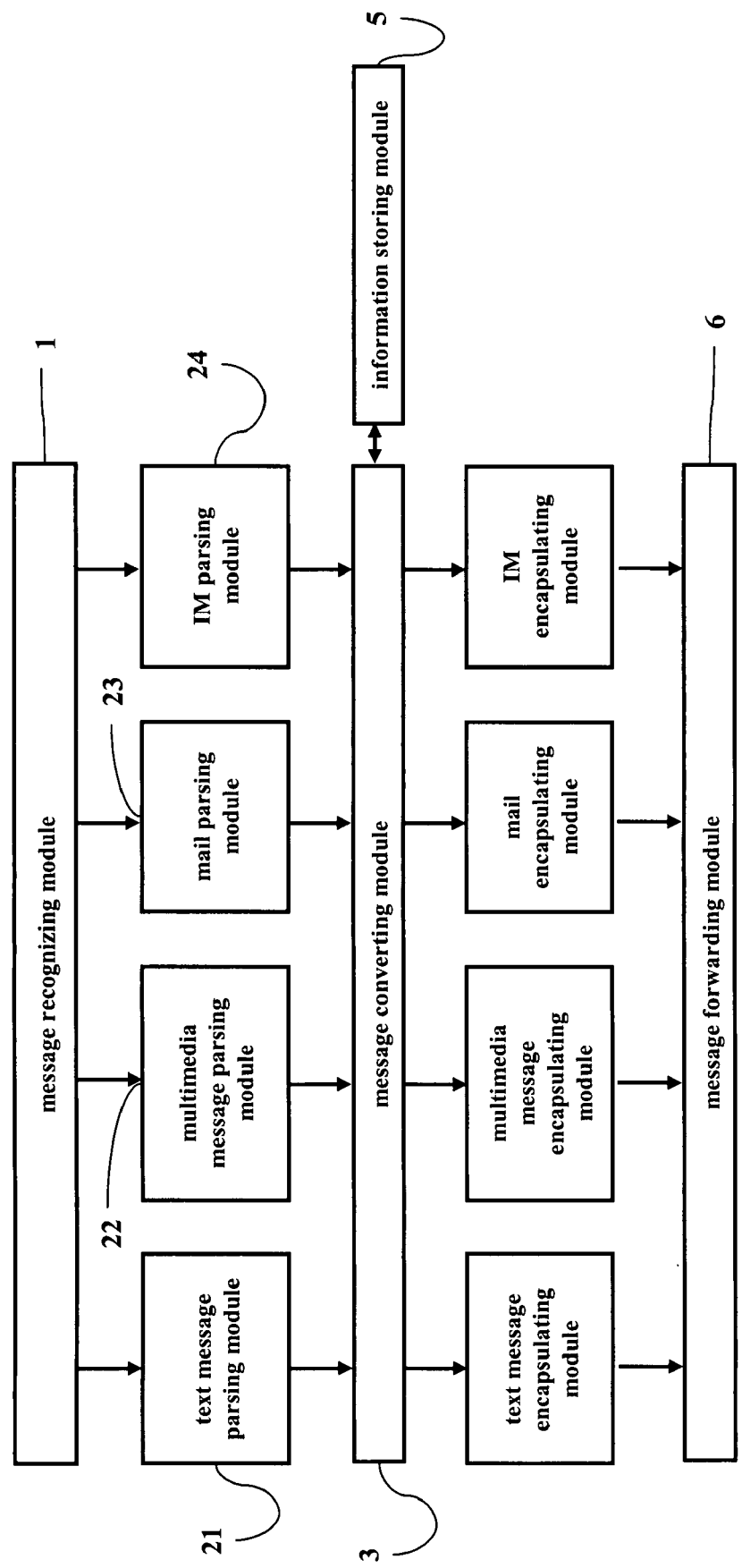
FIG. 4 is a schematic diagram showing the configuration of Embodiment 4 of the message converting device according to the present invention.

FIG. 4 is a schematic diagram of the configuration of Embodiment 4 of the message converting device according to the present invention. In this embodiment, in addition to all the modules in Embodiment 3 described above, further included is a message forwarding module 6 connected to the text message encapsulating module 41, the multimedia message encapsulating module 42, the mail encapsulating module 43 and the Instant Message encapsulating module 44, and used for forwarding a received message to the message server.

Figure 5:
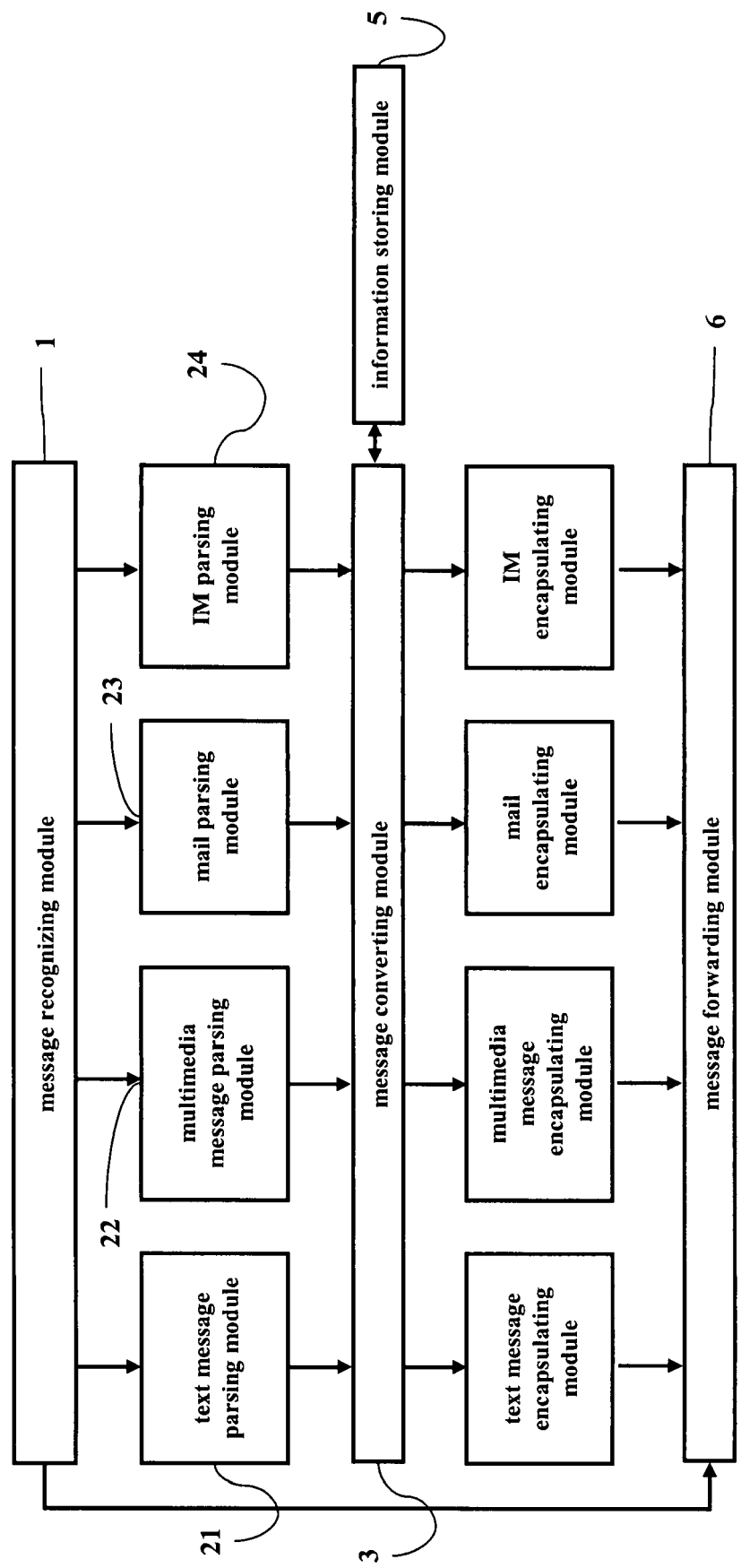
FIG. 5 is a schematic diagram showing the configuration of Embodiment 5 of the message converting device according to the present invention.

FIG. 5 is a schematic diagram of the configuration of Embodiment 5 of the message converting device according to the present invention. This embodiment includes all the modules of Embodiment 4 described above, with the difference lying in that the message forwarding module 6 is also connected to the message recognizing module 1 so that when the message parsing module 2 does not support parsing of a received message, the message recognizing module 1 sends the message directly to the message forwarding module 6 for subsequent processing.

Figure 6:
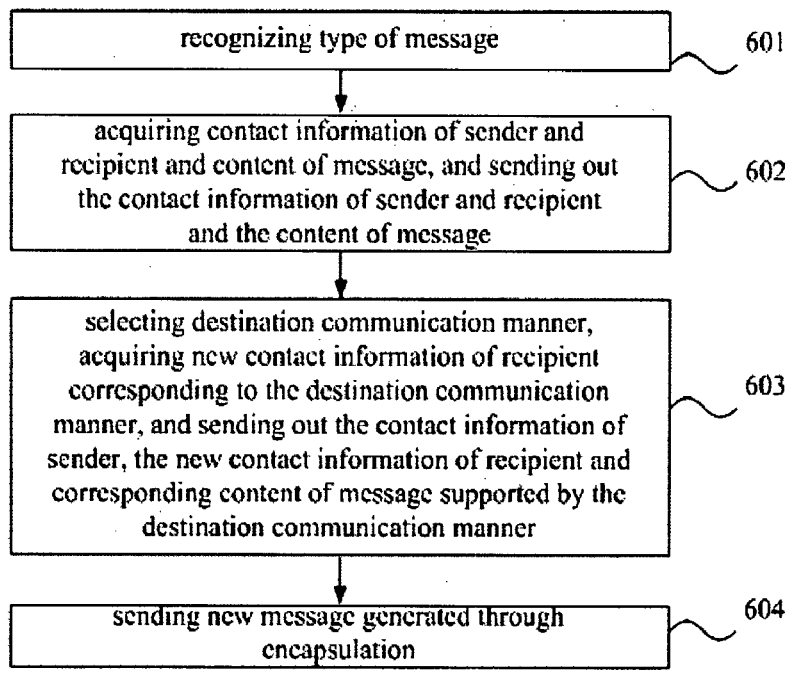
FIG. 6 is a flow chart illustrating Embodiment 1 of the message converting method according to the present invention.

FIG. 6 is a flow chart of Embodiment 1 of the message converting method according to the present invention, which includes the following steps.

601: The message recognizing module recognizes the type of a received message and sends the message to the message parsing module matching the type of the message.

The message recognizing module may recognize the type of the message in accordance with the header of the message or may recognize the type of the message in accordance with the address information of the destination message server carried in the message. For example, the message recognizing module receives the following IMPS:

<WV-CSP-Message xmlns="http://www.openmobilealliance.org/DTD/WV-CSP1.2">
<Session>
<SessionDescriptor>
. . .
</SessionDescriptor>
<Transaction>
. . .
<SendMessage-Request>
<DeliveryReport>T</DeliveryReport>
<MessageInfo>
. . .
<Recipient>
<User>
<UserID>wv:he@there.com</UserID>
</User>
. . .
</Recipient>
<Sender>
<User>
<UserID>wv:john@smith.com</UserID>
</User>
</Sender>

...
</MessageInfo>
<ContentData>
Hurry up; they are ringing the bells in the WV already . . .
</ContentData>
</SendMessage-Request>
</TransactionContent>
</Transaction>
</Session>
</WV-CSP-Message> in which the content wv:he@there.com indicated by UserID in Recipient is the contact information of the recipient, the content wv:john@smith.co" indicated by UserID in Sender is the contact information of the sender, and the content in ContentData is the content of the message. The message recognizing module recognizes from WV-CSP-Message in the message header of this IMPS that the message is an IM, and sends the message to the IM parsing module matching the type of the message.

602: The message parsing module acquires the contact information of the sender, the contact information of the recipient and the content of the message carried in the message, and sends the contact information of the sender, the contact information of the recipient and the content of message to message converting module.

For example, the message parsing module receives from the message recognizing module a text message carrying parameters as shown in Table 2.

TABLE 2

| Parameters of Table 2 | Reference | Type |
|---|---|---|
| Teleservice Identifier | 3.4.3.1 | mandatory |
| Service Category | 3.4.3.2 | optional |
| Originating Address | 3.4.3.3 | mandatory (1) |
| Originating Subaddress | 3.4.3.4 | optional (1) |
| Destination Address | 3.4.3.3 | mandatory (2) |
| Destination Subaddress | 3.4.3.4 | optional (2) |
| Bearer Reply Option | 3.4.3.5 | optional |
| Bearer Data | 3.4.3.7 | optional |

(1) for mobile-terminated messages (not present in mobile-terminated messages)
(2) for mobile-originated messages (not present in mobile-originated messages)

The message parsing module acquires the contact information of the recipient of the text message from Destination address" and "Destination Subaddress". A data structure in "Bearer Data" is shown in Table 3.

TABLE 3

| Subparameters | Subparameter ID Value |
|---|---|
| Message Identifier | '00000000' |
| User Data | '00000001' |
| User Response Code | '00000010' |
| Message Center Time Stamp | '00000011' |
| Validity Period - Absolute | '00000100' |
| Validity Period - Relative | '00000101' |
| Deferred Delivery Time - Absolute | '00000110' |
| Deferred Delivery Time - Relative | '00000111' |
| Priority Indicator | '00001000' |
| Privacy Indicator | '00001001' |
| Reply Option | '00001010' |
| Number of Messages | '00001011' |
| Alert on Message Delivery | '00001100' |
| Language Indicator | '00001101' |
| Call-Back Number | '00001110' |
| Message Display Mode | '00001111' |
| Multiple Encoding User Data | '00010000' |
| Message Deposit Index | '00010001' |
| Service Category Program Data | '00010010' |

TABLE 3-continued

| Subparameters | Subparameter ID Value |
|---|---|
| Service Category Program Results | '00010011' |
| Message Status | '00010100' |
| TP-Failure Cause | '00010101' |
| Enhanced VMN | '00010110' |
| Enhanced VMN Ack | '00010111' |

All the other values are reserved in which the content of the message is acquired from "User Data", and the contact information of the sender may also be acquired from "Call-Back Number".

603: The message converting module inquires conversion manner information for the terminal stored in the information storing module, selects from the conversion manner an destination communication manner that can support the message, and then acquires new contact information of the recipient corresponding to the destination communication manner from the information storing module before sending the contact information of the sender, the new contact information of the recipient and corresponding content of the message supported by the destination communication manner to the message encapsulating module corresponding to the destination communication manner.

604: The message encapsulating module encapsulates the contact information of the sender, the new contact information of the recipient and the corresponding content of the message, and sends a new message generated through the encapsulation to the address designated by the new contact information of the recipient.

Figure 7:
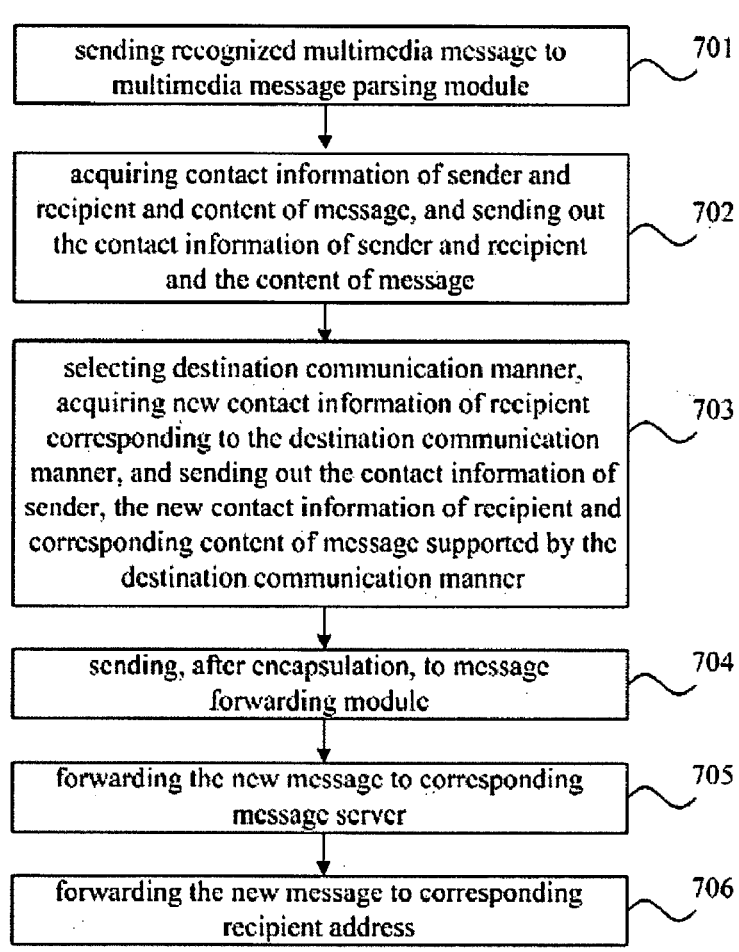
FIG. 7 is a flow chart illustrating Embodiment 2 of the message converting method according to the present invention.

FIG. 7 is a flow chart of Embodiment 2 of the message converting method according to the present invention, which includes the following steps.

701: The message recognizing module receives a message, recognizes that the type of the message is multimedia message, in accordance with the address information of the destination message server: mmsc.monternet.com, carried in the message, and sends the message to the multimedia message parsing module matching the type of the message.

In deed, the message recognizing module, if determining that the type of the message is a text message or an Email in accordance with the address information of the destination message server carried in the message, sends the message, respectively, to the text message parsing module or mail parsing module matching the type of the message.

702: The multimedia message parsing module acquires the contact information of the sender, for example, 13611122222, the contact information of the recipient, for example, 13661113333 and the content of the message, for example, greeting words like "Happy Festival" and two photos named "1.JPEG" and "2.JPEG" respectively, carried in the message, and sends the contact information of the sender, the contact information of the recipient and the content of the message to the message converting module.

703: The message converting module inquires information stored in the information storing module on the conversion manner for the terminal corresponding to 13661113333, the contact information of the recipient, so as to be aware that the communication manner may be converted from multimedia message to a communication manner, such as text message, Email or IM, or may be converted to a communication manner such as combining text message and Email or combining IM and Email, and selects to convert the communication manner from multimedia message to combining text message and Email in accordance with a preset parameter for a communication manner conversion order; and then acquires, from the information storing module, new contact information of the recipient: 13661113333 for the contact information of text message, and jieshoufang@123.com for the contact information of Email, which correspond to 13661113333, the contact information of the recipient, before sending to the text message, encapsulating module the contact information of the sender, for example, 13611122222, the new contact information of the recipient, for example 13661113333 and the corresponding content of the message corresponding to the communication manner of text message, for example, "Happy Festival", and sending to the mail encapsulating module the contact information of the sender, for example, 13611122222, the new contact information of the recipient, for example, jieshoufang@123.com and corresponding content of the message corresponding to the communication manner of Email, i.e., the two photos named "1.JPEG" and "2.JPEG" respectively.

704: The text message encapsulating module encapsulates the contact information of the sender, for example, 13611122222, the new contact information of the recipient, for example, 13661113333 and the corresponding content of the message, for example, "Happy Festival", and sends a new message generated through the encapsulation to the message forwarding module; and the mail encapsulating module encapsulates the contact information of the sender, for example, 13611122222, the new contact information of the recipient, for example, jieshoufang@123.com and the photos named "1.JPEG" and "2.JPEG" respectively, and sends a new message generated through the encapsulation to the message forwarding module.

705: The message forwarding module forwards the new message generated through the encapsulation by the text message encapsulating module to a text message server matching the text message encapsulating module, and forwards the new message generated through the encapsulation by the mail encapsulating module to a mail server matching the mail encapsulating module.

706: The text message server sends "Happy Festival" in a text message to the terminal with the number 13661113333; and the mail server sends the photos named "1.JPEG" and "2.JPEG" respectively in an Email to the mailbox with address jieshoufang@123.com.

If, in 703, the message converting module selects, from the communication manners supported by the terminal at the recipient side, the communication manner of combining IM and Email to send the message, in accordance with the preset parameter, then the message converting module sends to the IM encapsulating module the contact information of the sender 13611122222, the new contact information of the recipient 2298706@123.com corresponding to 13661113333, and the corresponding content of the message "Happy Festival" corresponding to the communication manner of IM, in a manner analogous to the processing manner for text message. Accordingly, in step 704, the IM encapsulating module encapsulates the contact information of the sender 13611122222, the new contact information of the recipient 2298706@123.com and the corresponding content of the message "Happy Festival", and forwards a new message generated through the encapsulation to the message forwarding module.

In addition, in 703, the message converting module may also acquire from the information storing module the new contact information of the sender 13611122222 and fasongfang@123.com corresponding to the contact information of the sender 13611122222 and corresponding to the communication manners of text message and Email, respectively, before sending to the text message encapsulating module the new contact information of the sender 13611122222, the new contact information of the recipient 13661113333 and the corresponding content of the message "Happy Festival" corresponding to the communication manner of text message, and sending to the mail encapsulating module the new contact information of the sender fasongfang@123.com, the new contact information of the recipient jieshoufang@123.com and the corresponding content of the message corresponding to the communication manner of Email, i.e., the two photos named "1.JPEG" and "2.JPEG" respectively. Accordingly, in step 704, the text message encapsulating module encapsulates the new contact information of the sender 13611122222, the new contact information of the recipient 13661113333 and the corresponding content of the message "Happy Festival", and sends a new message generated through the encapsulation to the message forwarding module; and the mail encapsulating module encapsulates the new contact information of the sender fasongfang@123.com, the new contact information of the recipient jieshoufang@123.com and the photos named "1.JPEG" and "2.JPEG" respectively, and sends a new message generated through the encapsulation to the message forwarding module.

Furthermore, in 701, the message recognizing module, when receiving a message, may also recognize that the type of the message is multimedia message in accordance with the address information of the destination message server: mmsc.monternet.com, carried in the message, and determine whether the message parsing module supports parsing of a multimedia message in accordance with information on the message parsing module stored beforehand. If supports, the multimedia message is sent to the multimedia message parsing module; otherwise, the multimedia message is sent to the terminal whose number is 13661113333. Sending the multimedia message to the terminal with the number 13661113333 includes the following steps: the message recognizing module sends the multimedia message to the message forwarding module; the message forwarding module forwards the multimedia message to the message server whose address is mmsc.monternet.com; and the message server forwards the multimedia message to the terminal whose number is 13661113333.

In addition, as to Embodiment 3 of the message converting method according to the present invention, steps 701, 702, 704 through 706 are similar to Embodiment 2 described above, the detail description of which is therefore omitted, while step 703 includes the following steps.

7031: The message converting module inquires the information stored in the information storing module on the conversion manner for the terminal corresponding to 13661113333, the contact information of the recipient, so as to be aware that the communication manner may be converted from multimedia message to the communication manners of combining text message and Email or combining IM and Email, and selects the communication manner of combining text message and Email in accordance with the preset parameter of communication manner conversion order.

7032: The message converting module determines whether the message encapsulating module supports encapsulating a new message sent in text message and Email in accordance with information on the message encapsulating module stored therein beforehand. If supports, 7033 is performed; otherwise, 7031 is performed again to select another destination communication manner. In this embodiment, options for such destination communication manners are IM and Email.

7033: The message converting module acquires, from the information storing module, the new contact information of the recipient: 13661113333 for contact information for text message, and jieshoufang@123.com for contact information for Email, which correspond to 13661113333, the contact information of the recipient.

7034: The message converting module sends to the text message encapsulating module the contact information of the sender 13611122222, the new contact information of the recipient 13661113333 and the corresponding content of the message "Happy Festival" corresponding to the communication manner of text message, and sends to the mail encapsulating module the contact information of the sender 13611122222, the new contact information of the recipient jieshoufang@123.com and the corresponding content of the message corresponding to the communication manner of Email, i.e., the two photos named "1.JPEG" and "2.JPEG" respectively.

Figure 8:
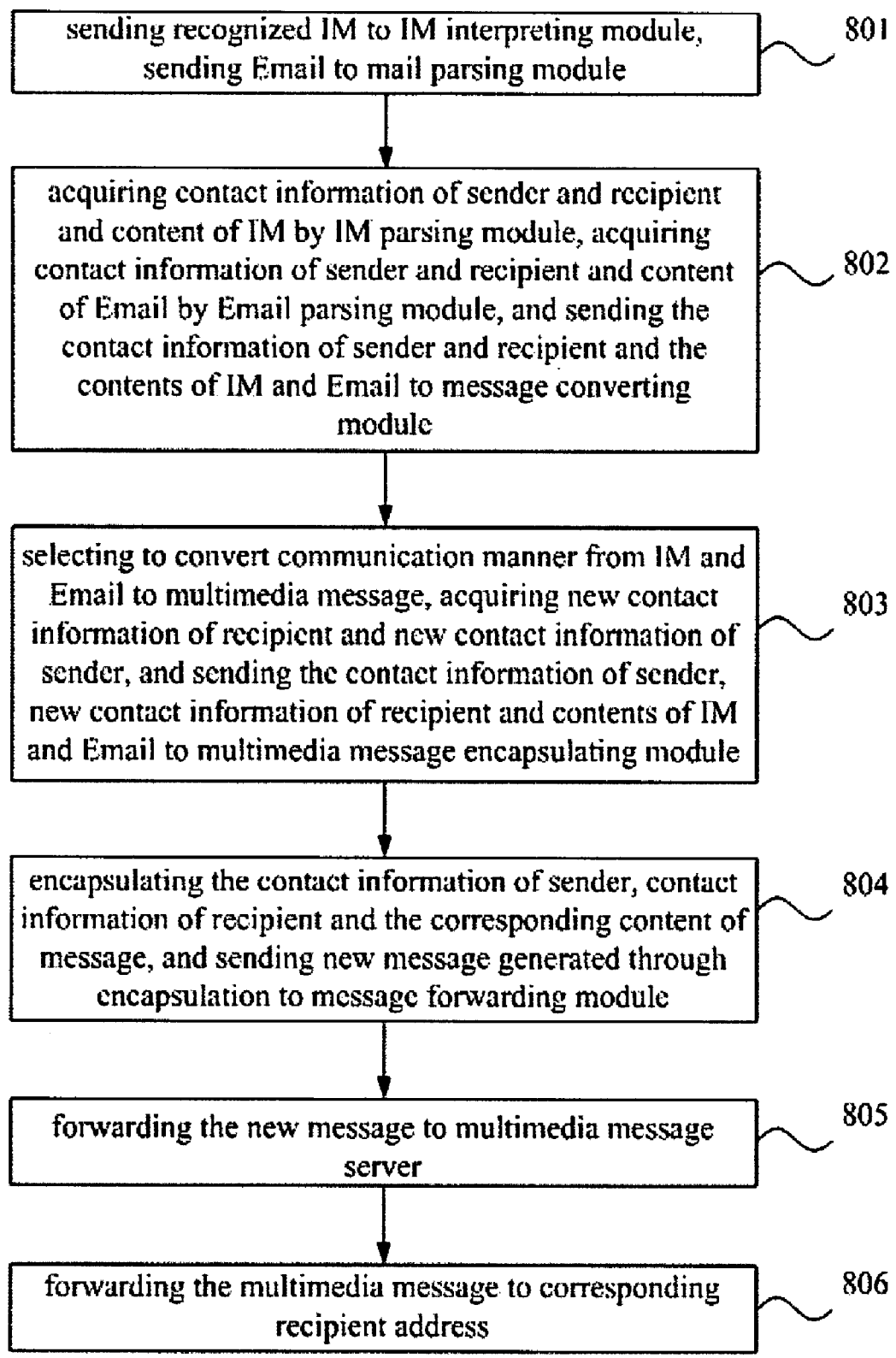
FIG. 8 is a flow chart illustrating Embodiment 4 of the message converting method according to the present invention.

FIG. 8 is a flow chart of Embodiment 4 of the message converting method according to the present invention, which includes the following steps.

801: The message recognizing module receives a message, recognizes that the type of the message is IM, in accordance with the address information of the destination message server: im.123.com, carried in the message, and sends the message to the IM parsing module matching the type of the message; meanwhile, the message recognizing module receives another message, recognizes that the type of the message is Email, in accordance with the address information of the destination message server: smtp.123.com, and sends the message to the mail parsing module matching the type of the message.

802: The IM parsing module acquires the contact information of the recipient jieshoufang@123.com, the contact information of the sender fasongfang@123.com and the content of the message, for example, greeting words like "Happy Festival", carried in the IM, and sends the contact information of the sender, the contact information of the recipient and the content of message to the message converting module; while the mail parsing module acquires the contact information of the recipient jieshoufang@123.com, the contact information of the sender fasongfang@123.com and the content of the message, for example, two photos named "1.JPEG" and "2.JPEG" respectively, carried in the Email, and sends the contact information of the sender, the contact information of the recipient and the content of the message to the message converting module.

803: The message converting module notices that, among the message queue to be processed, there are an IM and an Email having the same contact information of the recipient, i.e., the two messages have the same destination address and the same contact information of the sender, and decides to combine the IM and the Email in accordance with a preset parameter in order to reduce the transmission of network information and improve performance of the network system; thus inquires information stored in the information storing module on the conversion manner of the terminal corresponding to jieshoufang@123.com, the contact information of the recipient, so as to be aware that the communication manner may be converted from IM and Email to multimedia message or text message, and selects to convert the communication manner from IM and Email to multimedia message in accordance with a preset parameter of communication manner conversion order; and then acquires, from the information storing module, new contact information of the recipient: 13661113333 for contact information for multimedia message, which corresponds to the contact information of the recipient jieshoufang@123.com, and new contact information of the sender: 13611122222 for contact information for multimedia message, which corresponds to the contact information of the sender fasongfang@123.com, before sending to the multimedia message encapsulating module the new contact information of the sender 13611122222, the new contact information of the recipient 13661113333 and the contents of the IM and the Email "Happy Festival" and the two photos named "1.JPEG" and "2.JPEG" respectively.

804: The multimedia message encapsulating module encapsulates the new contact information of the sender 13611122222, the new contact information of the recipient 13661113333 and the corresponding content of the message, "Happy Festival" and the two photos named "1.JPEG" and "2.JPEG" respectively, and sends a new message generated through the encapsulation to the message forwarding module.

805: The message forwarding module forwards the new message sent from the multimedia message encapsulating module to a multimedia message server matching the multimedia message encapsulating module;

806: The multimedia message server sends in a multimedia message "Happy Festival" and the two photos named "1.JPEG" and "2.JPEG" respectively to the terminal with the number 13661113333.

In step 801, there may be a lag between the time when the message recognizing module receives the IM and the time when receives the Email, the IM and the Email being sent from the same sender to the same recipient. This lag should be shorter than a message time for the message converting module to process a whole message queue. The IM and the Email may be processed in accordance with the procedures of 801 and 802, respectively; and may undergo a combination process in accordance with the flows indicated in 803 and 804 as long as in 803, the IM and the Email wait in the same queue to be processed by the message converting module.

In the embodiments of the present invention, a user only needs to enter the number of the terminal at the recipient side when sending a message to the terminal user at the recipient side, and the message converting device may select an destination communication manner supported by the terminal at the recipient side and supporting the content of the message sent by the user in accordance with the content of the message, convert the contact information of the recipient into new contact information of the recipient corresponding to the destination communication manner; and send corresponding content of the message supported by the destination communication manner to an address designated by the new contact information of the recipient, without requiring the user to store and be aware of information on the model and capability of the terminal at the recipient side beforehand, thereby bringing convenience to the user, occupying a relatively smaller storage capacity of the terminal and lowering the cost of the terminal in comparison with the prior art.

The destination communication manner that can support the corresponding content is determined in accordance with the content of the message, ensuring that the message can be recognized by the terminal at the recipient side properly and completely when the capability of the terminal at the recipient side permits, thereby avoiding the situation in the prior art that a terminal at the recipient side, which does not support the communication manner pre-selected by the user at the sender side, fails to properly and completely recognize the entirety or part of the content of the message sent by the terminal at the sender side and thus frustrates the user with inconvenience and disadvantageous results.

The above embodiments are only meant to describe the technical solutions of the present invention rather than giving a restrictive definition to the present invention. The description of the present invention is made in detail by referring to the above preferred embodiments, while those with ordinary skill in the art should understand that they can nevertheless make modifications or equivalent alternatives to the technical solutions of the present invention without departing from the scope and spirit of the technical solutions of the present invention.

What is claimed is:

1. A system for message converting, comprising:
a message recognizing module configured for recognizing a type of a message and providing the message according to the type;
a message parsing module configured for parsing the message provided by the message recognizing module according to the type, determining whether the parsing of the message is supported, and if the parsing of the message is supported, acquiring sender information, recipient information and content of the message from the message;
a message converting module configured for obtaining conversion manner information for a terminal at a recipient, determining a destination communication manner for sending the message according to the content of the message and the conversion manner information, and converting the recipient information into new recipient information corresponding to the destination communication manner, wherein the conversion manner information for the terminal at the recipient is decided based on the communication manner that the terminal at the recipient supports; and
a message encapsulating module configured for encapsulating the sender information, the new recipient information and corresponding content of the message supported by the destination communication manner to generate a new message.

2. The system for message converting of claim 1, further comprising:
an information storing module configured for storing the conversion manner information for the terminal and user information of the terminal.

3. The system for message converting of claim 2, wherein the message parsing module comprises at least one of the following: a text message parsing module, a multimedia message parsing module, a mail parsing module and an instant message parsing module.

4. The system for message converting of claim 2, wherein the message encapsulating module comprises at least one of the following a text message encapsulating module, a multimedia message encapsulating module, a mail encapsulating module and an instant message encapsulating module.

5. The system for message converting of claim 4, wherein the message converting module and the information storing module are arranged integrally.

6. The system for message converting of claim 1, further comprising:
a message forwarding module configured for forwarding the new message from the message encapsulating module to a message server.

7. The system for message converting of claim 6, wherein the message forwarding module is configured for forwarding the message from the message recognizing module.

8. A method for message converting, comprising:
receiving a message to be sent to a recipient from a sender;
obtaining sender information, recipient information and content of the message from the message, and conversion manner information of a terminal at the recipient;
determining a destination communication manner supporting the content of the message pursuant to the conversion manner information and the recipient information, wherein the conversion manner information for the terminal at the recipient is decided based on the communication manner that the terminal at the recipient supports;
acquiring new recipient information according to the recipient information and the destination communication manner; and
encapsulating the sender information, the new recipient information and corresponding content of the message supported by the destination communication manner,
wherein the obtaining further comprises:
recognizing the type of the message,
parsing the message according to the type;
determining whether the parsing of the message is supported; and
if the parsing of the message is supported, acquiring the sender information, the recipient information and the content of the message from the message.

9. The method for message converting of claim 8, further comprising:
sending a new message generated through the encapsulation to an address designated by the new recipient information.

10. The method for message converting of claim 8, wherein the recognizing comprising:
recognizing the type of the message according to information in a message header or address information of a message server in the received message.

11. The method for message converting of claim 9, wherein when acquiring the new recipient information according to the recipient information and the destination communication manner, the method further comprises:
acquiring new sender information according to the sender information and the destination communication manner.

12. The method for message converting of claim 11, wherein when acquiring the new recipient information according to the recipient information and the destination communication manner, the method further comprises:
acquiring new sender information corresponding to the sender information and the destination communication manner.

13. The method for message converting of claim 12, wherein encapsulating the sender information, the new recipient information and the corresponding content of the message supported by the destination communication manner comprises:
encapsulating the new sender information, the new recipient information and the corresponding content of the message supported by the destination communication manner.

14. The method for message converting of claim 9, wherein the sending the new message generated through the encapsulation to the address designated by the new recipient information comprises:
forwarding the new message to a corresponding message server; and
forwarding, by the message server, the new message to the address designated by the new recipient information.

15. The method for message converting of claim 8, wherein after determining whether the parsing of the message is supported, the method further comprises:

if the parsing of the message is not supported, sending the message to the address designated by the recipient information.

16. The method for message converting of claim 15, wherein the sending the message to the address designated by the recipient information comprises:

sending the message to a message forwarding module;

forwarding, by the message forwarding module, the message to a message server in accordance with address information of the message server carried in the message; and forwarding, by the message server, the message to the address designated by the recipient information.

17. The method for message converting of claim 8, wherein the determining the destination communication manner supporting the content of the message pursuant to the conversion manner information and the recipient information, and acquiring the new recipient information according to the recipient information and the destination communication manner comprises:

selecting the destination communication manner supporting the content of the message according to the conversion manner information corresponding to the recipient information;

determining whether encapsulation of the message sent in the destination communication manner is supported; and if the encapsulation of the message sent in the destination communication manner is supported, acquiring the new recipient information corresponding to the recipient information and the destination communication manner; or if the encapsulation of the message sent in the destination communication manner is not supported, re-selecting a destination communication manner supporting the content of the message.

18. The method for message converting of claim 15, wherein the determining the destination communication manner supporting the content of the message pursuant to the conversion manner information and the recipient information, and acquiring the new recipient information according to the recipient information and the destination communication manner comprises:

selecting the destination communication manner supporting the content of the message according to the conversion manner information corresponding to the recipient information;

determining whether encapsulation of the message sent in the destination communication manner is supported; and if the encapsulation of the message sent in the destination communication manner is supported, acquiring the new recipient information corresponding to the recipient information and the destination communication manner; or if the encapsulation of the message sent in the destination communication manner is not supported, re-selecting a destination communication manner supporting the content of the message.

19. The method for message converting of claim 16, wherein the determining the destination communication manner supporting the content of the message pursuant to the conversion manner information and the recipient information, and acquiring the new recipient information according to the recipient information and the destination communication manner comprises:

selecting the destination communication manner supporting the content of the message according to the conversion manner information corresponding to the recipient information;

determining whether encapsulation of the message sent in the destination communication manner is supported; and if the encapsulation of the message sent in the destination communication manner is supported, acquiring the new recipient information corresponding to the recipient information and the destination communication manner; or if the encapsulation of the message sent in the destination communication manner is not supported, re-selecting a destination communication manner supporting the content of the message.

20. The method for message converting of claim 8, wherein when there are two or more messages with the same contact information of sender and the same contact information of recipient in a message queue, the messages undergo a combination process according to a preset parameter.

21. The method for message converting of claim 20, wherein there is a lag between the messages, the lag being not greater than the time for processing the whole message queue.

22. The method for message converting of claim 8, wherein when there are two or more destination communication manners supporting the content of the message, if the communication manner is determined to be convertible to at least two of the destination communication manners by inquiring the conversion manner information of the terminal corresponding to contact information of recipient, then the destination communication manner supporting the content of the message is selected according to a preset parameter of communication manner conversion order, and the new recipient information corresponding to the recipient information and the destination communication manner is acquired respectively; and the sender information, the new recipient information and the corresponding content of the message supported by the destination communication manner are encapsulated respectively, and the new messages generated through the encapsulation are sent respectively to the addresses designated by the new recipient information.

23. The method for message converting of claim 22, wherein the destination communication manner is text message, Email or IM.

* * * * *